United States Patent
Lewandowski

[11] Patent Number: 6,155,822
[45] Date of Patent: Dec. 5, 2000

[54] FORCED CONVECTION FURNACE AND METHOD FOR HEATING GLASS SHEETS

[75] Inventor: Troy R. Lewandowski, Maumee, Ohio

[73] Assignee: Glasstech, Inc., Perrysburg, Ohio

[21] Appl. No.: 09/310,309

[22] Filed: May 12, 1999

Related U.S. Application Data

[62] Division of application No. 09/208,177, Dec. 9, 1998.

[51] Int. Cl.[7] .................................................... F27B 3/22
[52] U.S. Cl. ............................ 432/159; 432/11; 65/119
[58] Field of Search ..................... 432/11, 121, 146, 432/152, 159; 65/111, 119, 182.2, 273

[56] References Cited

U.S. PATENT DOCUMENTS

| | | | |
|---|---|---|---|
| 3,048,383 | 8/1962 | Champlin | 65/182.2 |
| 4,738,705 | 4/1988 | McMaster | 65/119 |
| 4,938,410 | 7/1990 | Kondo . | |
| 5,094,678 | 3/1992 | Kramer et al. | 65/273 |
| 5,338,008 | 8/1994 | Okuno et al. . | |
| 5,669,954 | 9/1997 | Kormanyos . | |
| 5,672,191 | 9/1997 | Kormanyos . | |
| 5,735,924 | 4/1998 | Kormanyos . | |
| 5,762,677 | 6/1998 | Kormanyos . | |
| 5,792,232 | 8/1998 | Kormanyos . | |
| 5,951,734 | 9/1999 | Friedel et al. | 65/119 |

*Primary Examiner*—Denise L. Ferensic
*Assistant Examiner*—Gregory A. Wilson
*Attorney, Agent, or Firm*—Brooks & Kushman P.C.

[57] ABSTRACT

A forced convection furnace (20) and method for heating glass sheets includes a forced convection heater (42) having lower hot gas distributors (44) located below alternate conveyor rolls (38) to provide upward gas flow both upstream and downstream thereof along a direction of conveyance to provide heating from below of the glass sheets being conveyed within a heating chamber (32) of a housing (22) of the furnace. The forced convection heater (42) also includes upper hot gas distributors (52) for providing heating from above of the glass sheets being conveyed within the heating chamber (32).

5 Claims, 8 Drawing Sheets

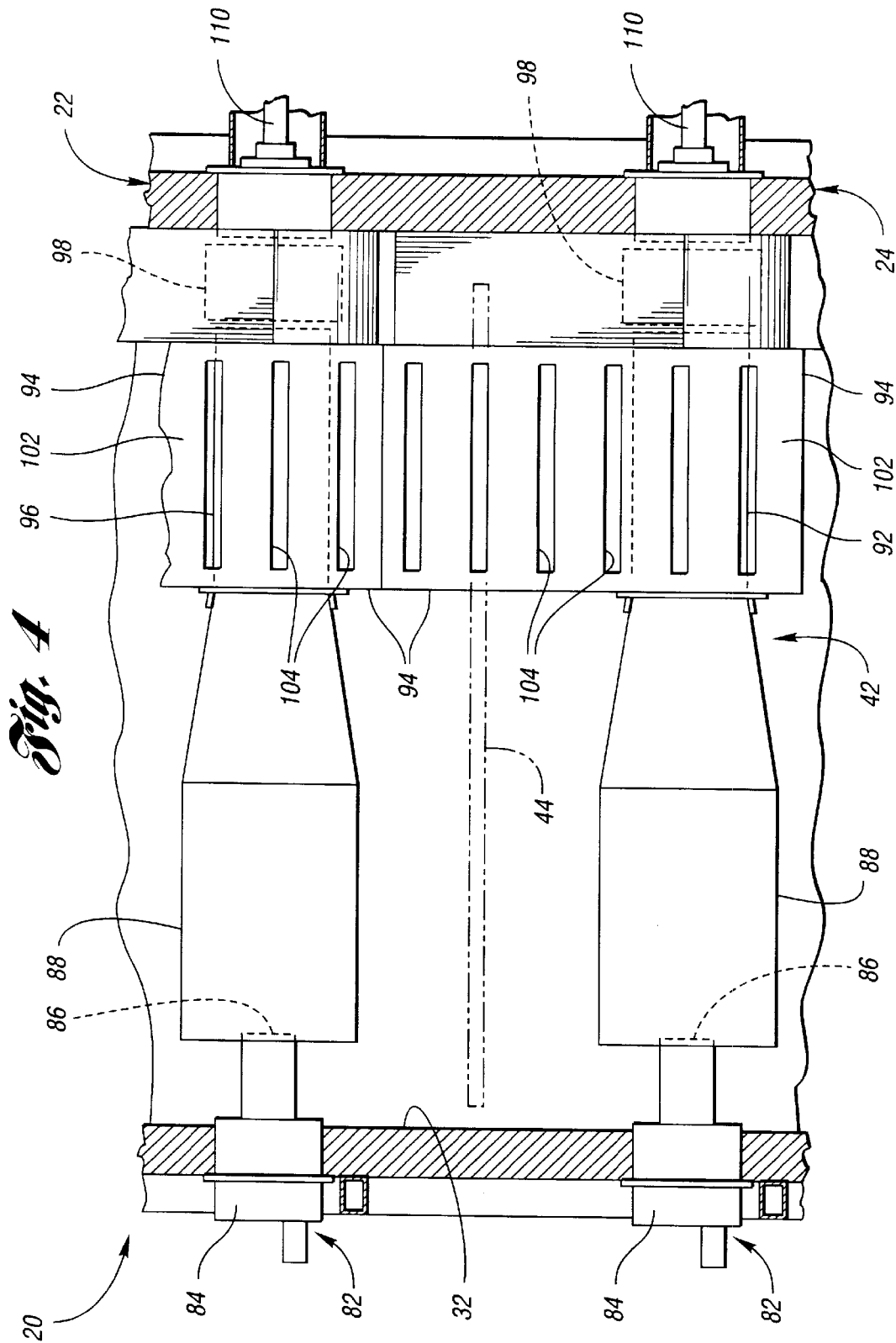

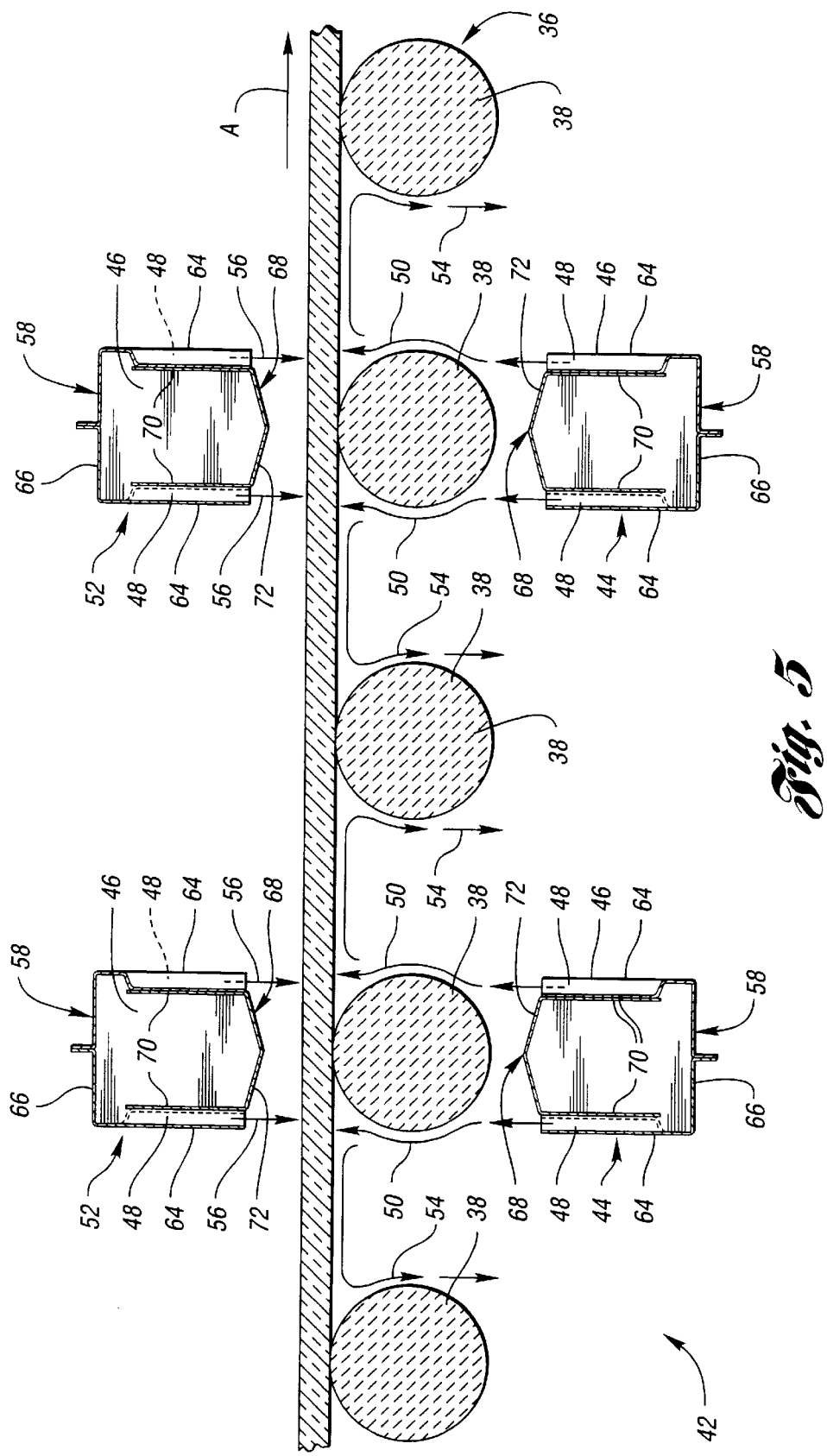

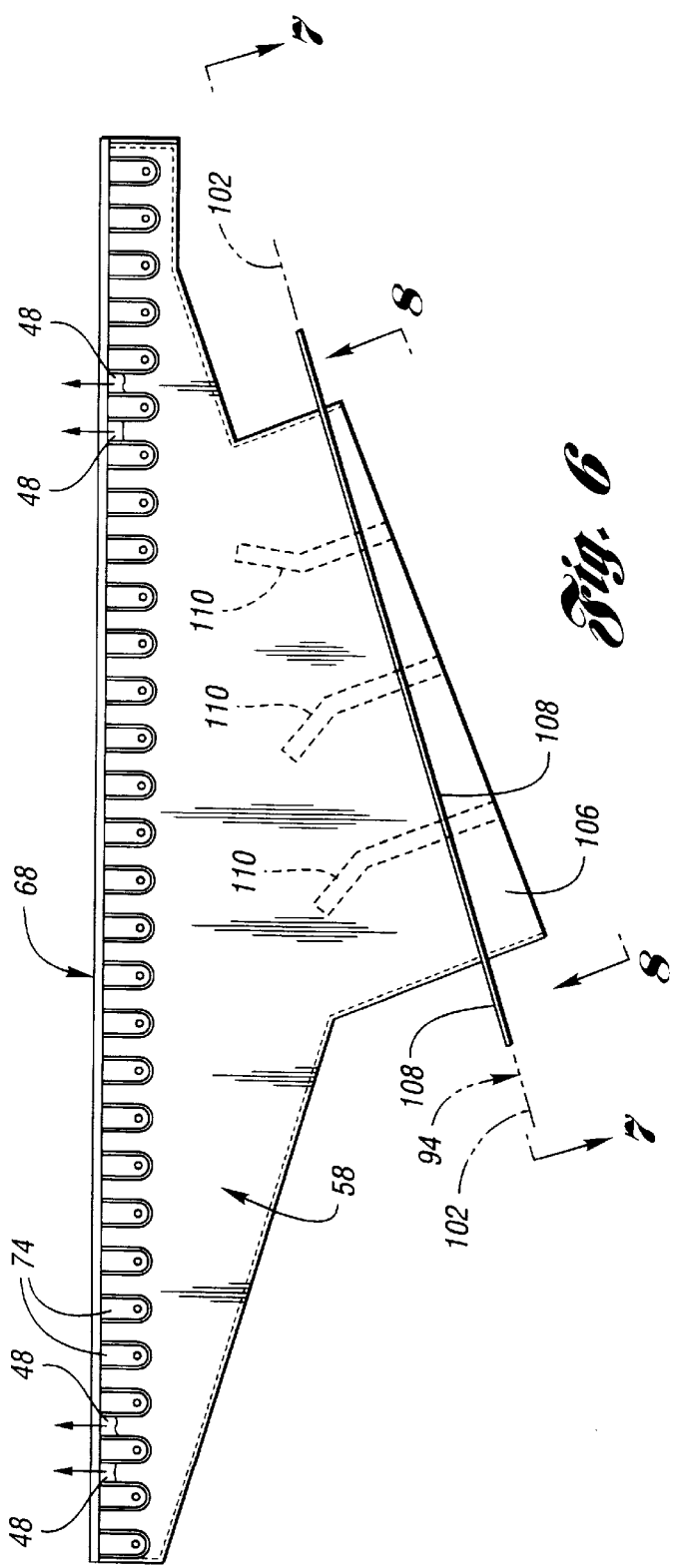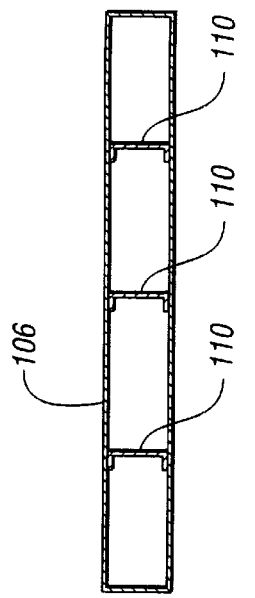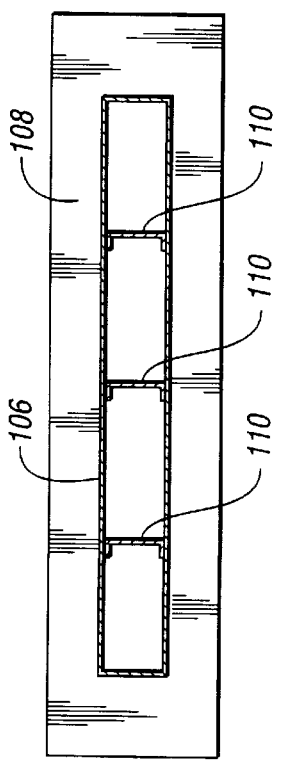

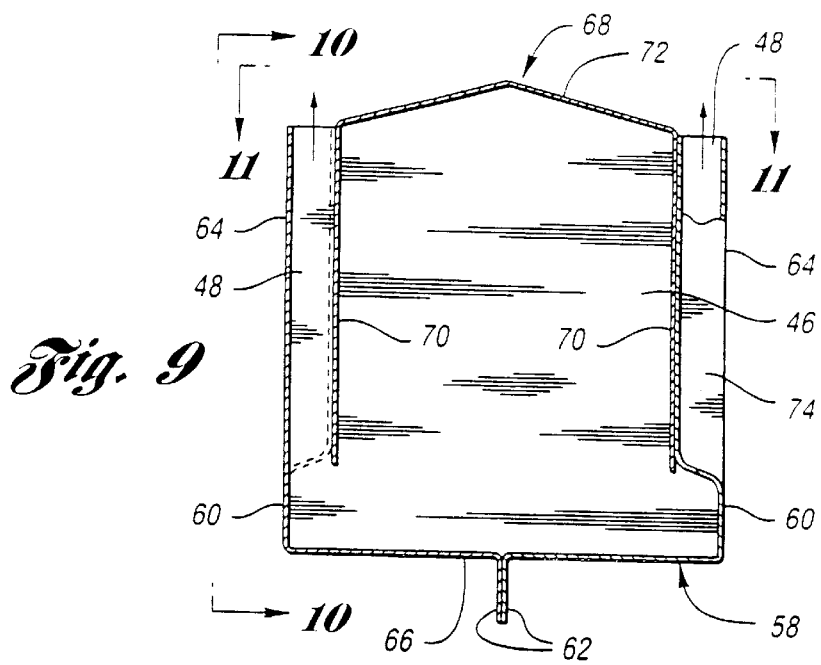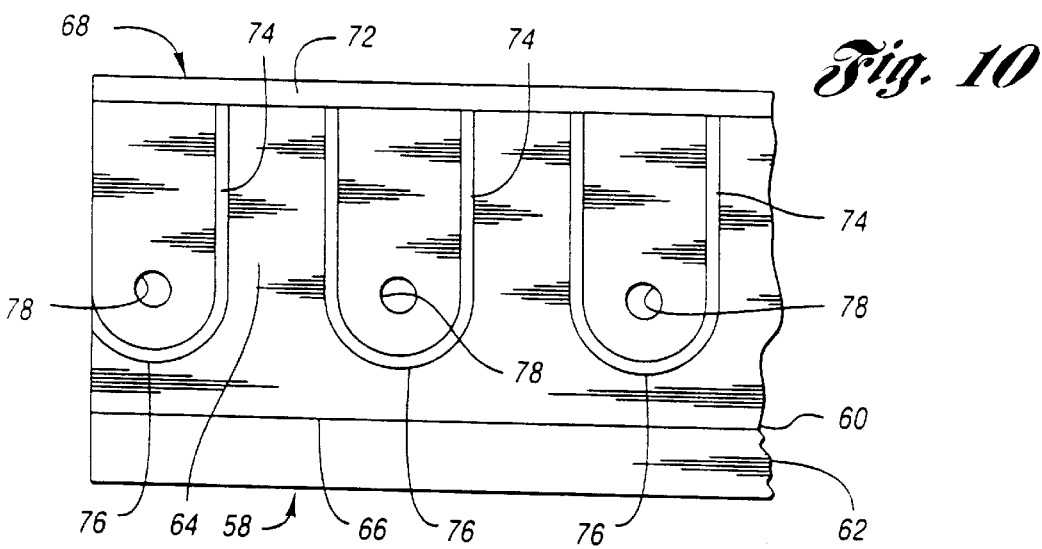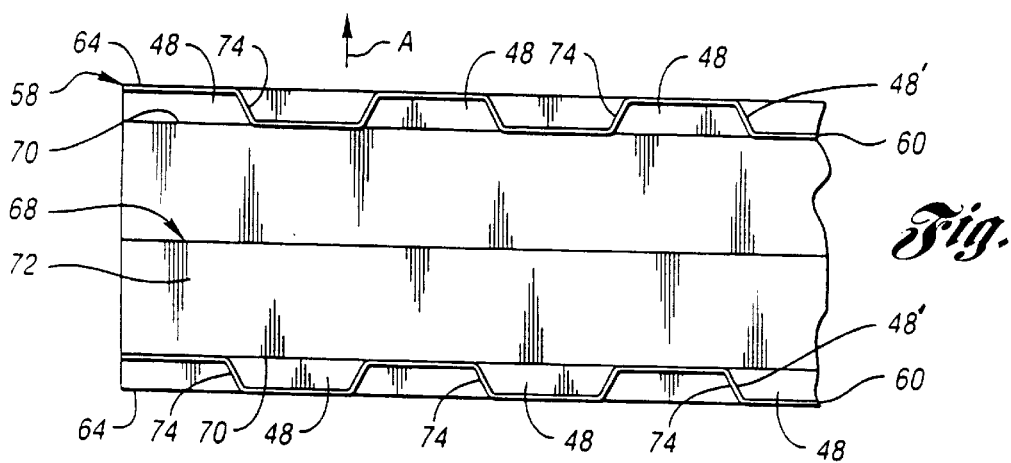

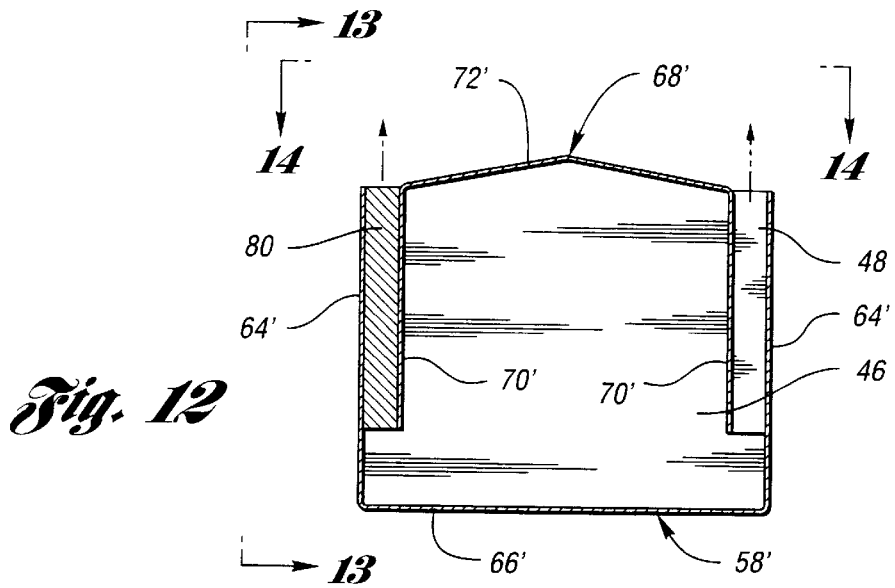
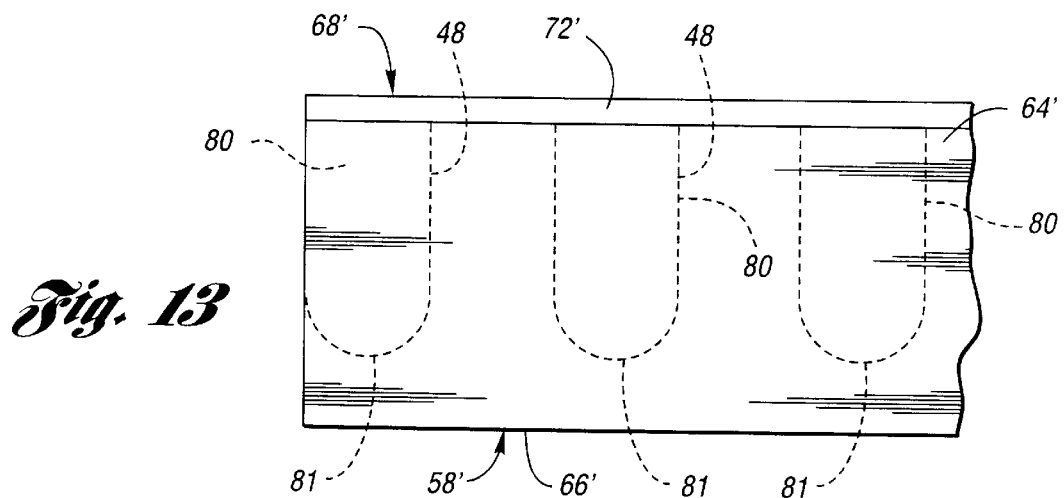
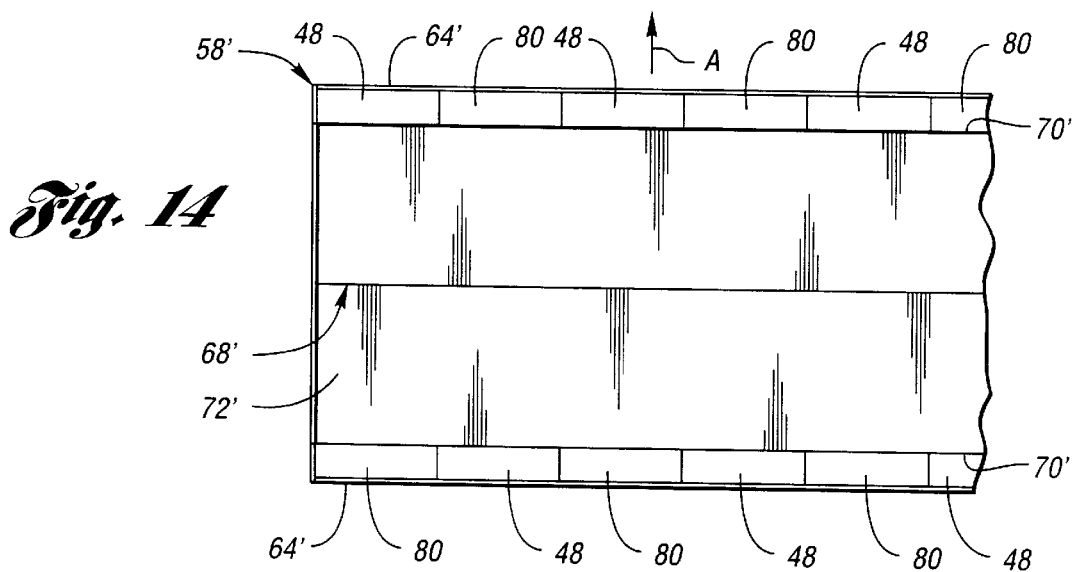

FORCED CONVECTION FURNACE AND METHOD FOR HEATING GLASS SHEETS

This is a divisional of copending application Ser. No. 09/208,177 filed on Dec. 9, 1998.

TECHNICAL FIELD

This invention relates to a forced convection furnace and a method for heating glass sheets in preparation for processing.

BACKGROUND ART

The prior art discloses forced convection furnaces for heating of glass sheets in preparation for processing such as forming, tempering, heat strengthening, annealing, and coating, etc. Such prior art forced convection furnaces for heating glass sheets are disclosed by the United States Patents of Kenneth R. Kormanyos: U.S. Pat. Nos. 5,669,954; 5,672,191; 5,735,924; 5,762,677; and 5,792,232. In those Kormanyos patents, the glass sheets are conveyed on a roll conveyor during the heating which is performed by lower and upper sets of hot gas distributors that supply pressurized hot gas flows to the lower and upper surfaces of the conveyed glass sheets. An associated lower hot gas distributor is located between each pair of adjacent conveyor rolls, such that the spent quenching gas must flow downwardly between the conveyor rolls and the hot gas distributor. Furthermore, any broken glass that is lodged between the conveyor rolls and the lower hot gas distributors must be removed before commencing further heating of the glass sheets.

An object of the present invention is to provide an improved method for heating glass sheets.

In carrying out the above object, the method for heating glass sheets is performed by conveying the glass sheets by a roll conveyor on horizontal conveyor rolls spaced along a direction of conveyance within a housing heating chamber. Hot gas flow is supplied from below the roll conveyor upwardly adjacent alternate conveyor rolls through a pair of banks of nozzles associated with each alternate conveyor roll for upward flow both upstream and downstream of each alternate conveyor roll along the direction of conveyance to provide heating from below of the conveyed glass sheets. Hot gas flow is also supplied from above the conveyor downwardly to provide heating from above of the conveyed glass sheets.

In the preferred practice of the method, the glass sheets are heated by hot gas flows that are supplied upwardly and downwardly from aligned banks of nozzles to provide aligned lower and upper locations of hot gas impingement with the glass sheets being heated. The upwardly and downwardly supplied hot gas flows are supplied through lower and upper hot gas distributors that have a dimension along the direction of conveyance equal to the diameter of the conveyor rolls. Furthermore, the upwardly and downwardly supplied hot gas flows are supplied through lower and upper hot gas distributors that are formed from sheet metal.

The objects, features, and advantages of the present invention are readily apparent from the following detailed description of the best mode for carrying out the invention when taken in connection with the accompanying drawings.

BRIEF DESCRIPTION OF DRAWINGS

FIG. 4 is a sectional top plan view taken along the direction of line 4—4 in FIG. 3 to further illustrate the construction of the forced convection heater.

FIG. 5 is a sectional view taken in the same direction as FIG. 2, but at an enlarged scale to illustrate the conveyor rolls, the glass sheet being heated, and the lower and upper hot gas distributors of the forced convection heater.

FIG. 6 is an elevational view illustrating the construction of hot gas distributors of the forced convection heater.

FIG. 7 is a section view taken along the direction of line 7—7 in FIG. 6 to further illustrate the construction of the hot gas distributor.

FIG. 8 is a view taken along the direction of line 8—8 in FIG. 6 to illustrate the hot gas distributor.

FIG. 9 is a sectional view illustrating the construction of one embodiment of the hot gas distributor.

FIG. 10 is an elevational view taken along the direction of line 10—10 in FIG. 9 to further illustrate the one construction of the hot gas distributor.

FIG. 11 is a plan view taken along the direction of line 11—11 in FIG. 9 to further illustrate the construction of the one embodiment of the hot gas distributor.

FIG. 12 is a sectional view taken in the same direction as FIG. 9 of another embodiment of the hot gas distributor.

FIG. 13 is an elevational view taken along the direction of lines 13—13 in FIG. 12 to further illustrate the construction of this embodiment of the hot gas distributor.

FIG. 14 is a plan view taken along the direction of line 14—14 in FIG. 12 to further illustrate the construction of this embodiment of the hot gas distributor.

BEST MODE FOR CARRYING OUT THE INVENTION

Figure 1:
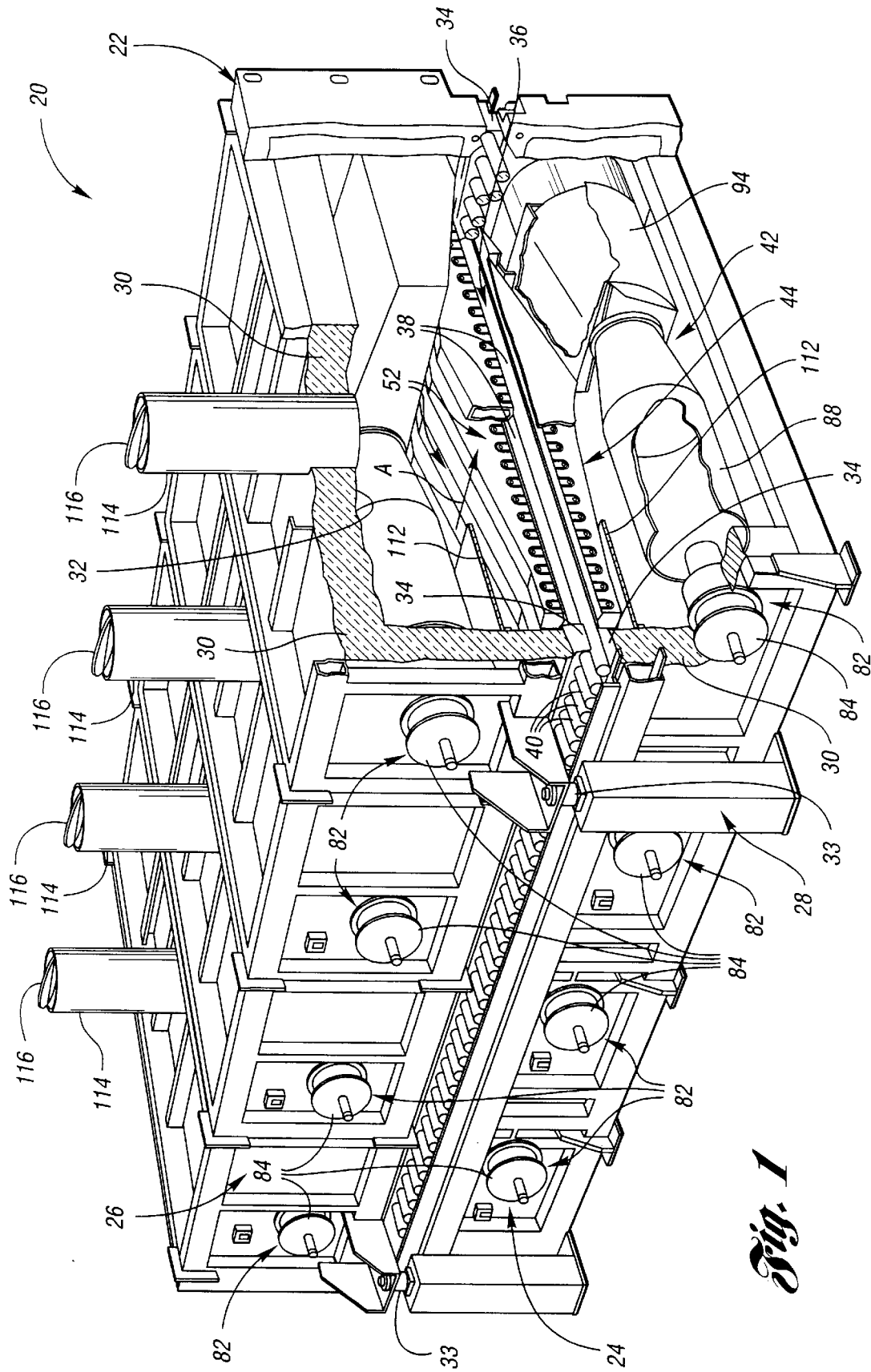
FIG. 1 is a perspective view of a forced convection furnace for heating glass sheets in accordance with the invention.

With reference to FIG. 1 of the drawings, a forced convection furnace for heating glass sheets is generally indicated by 20 and is constructed in accordance with the invention to perform the method thereof as is hereinafter more fully described. Both the furnace 20 and the method of the invention will be described in an integrated manner to facilitate an understanding of all aspects of the invention. Forced convection furnace 20 includes a housing 22 having lower and upper housing portions 24 and 26. More specifically, the housing 22 includes a framework 28 and insulation 30 that is supported by the framework to define a heating chamber 32. Adjustable mounts 33 of the furnace framework 28 adjustable position the upper housing portion 26 on the lower housing portion 24. Between the lower and upper housing portions 24 and 26, conveyor roll seals 34 provide sealing of the furnace heating chamber 32 as is hereinafter more fully described.

Figure 2:
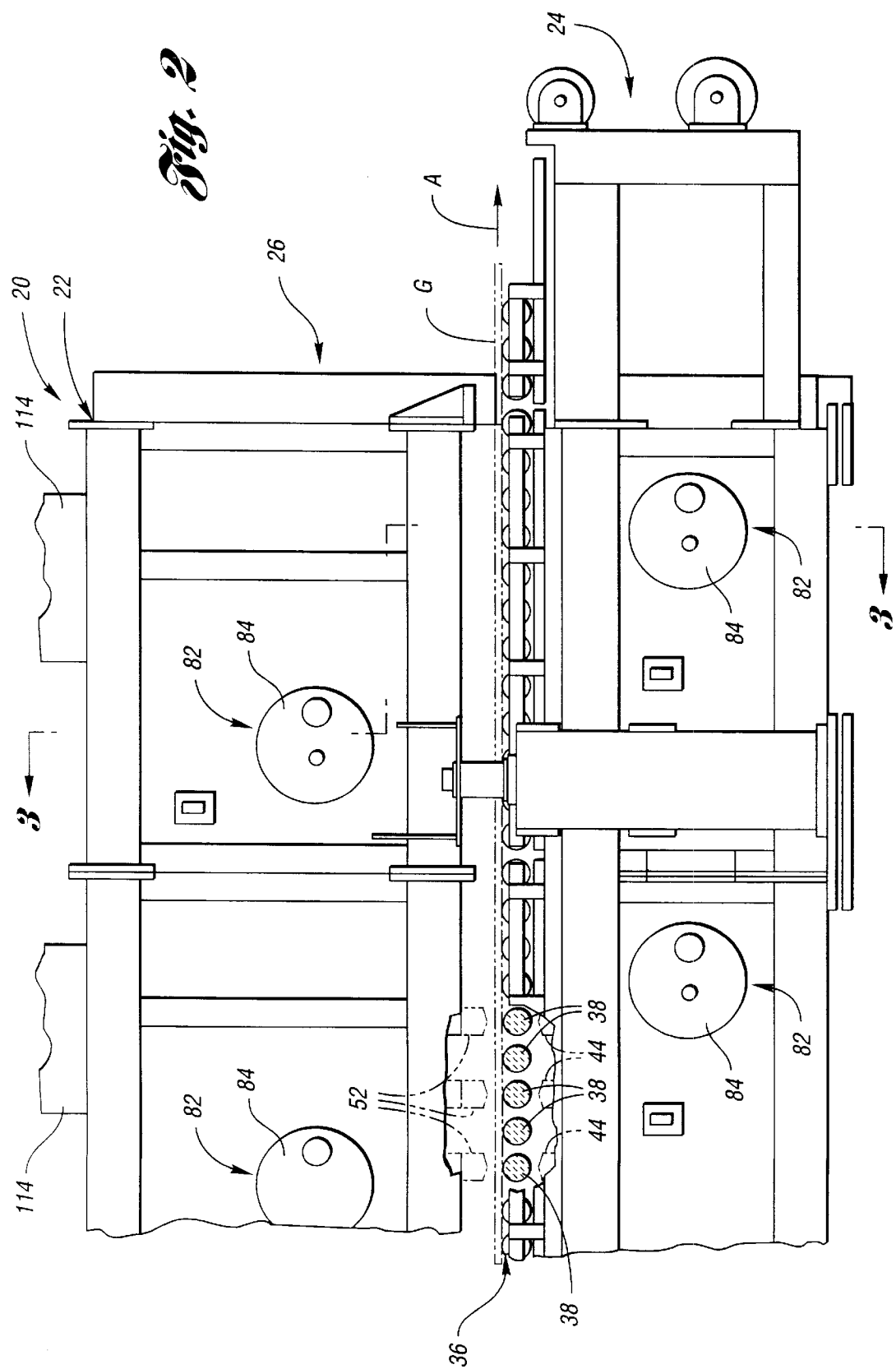
FIG. 2 is a partial side elevational view of the furnace that is partially broken away to illustrate a roll conveyor and lower and upper hot gas distributors of a forced convection heater of the furnace.
Figure 3:
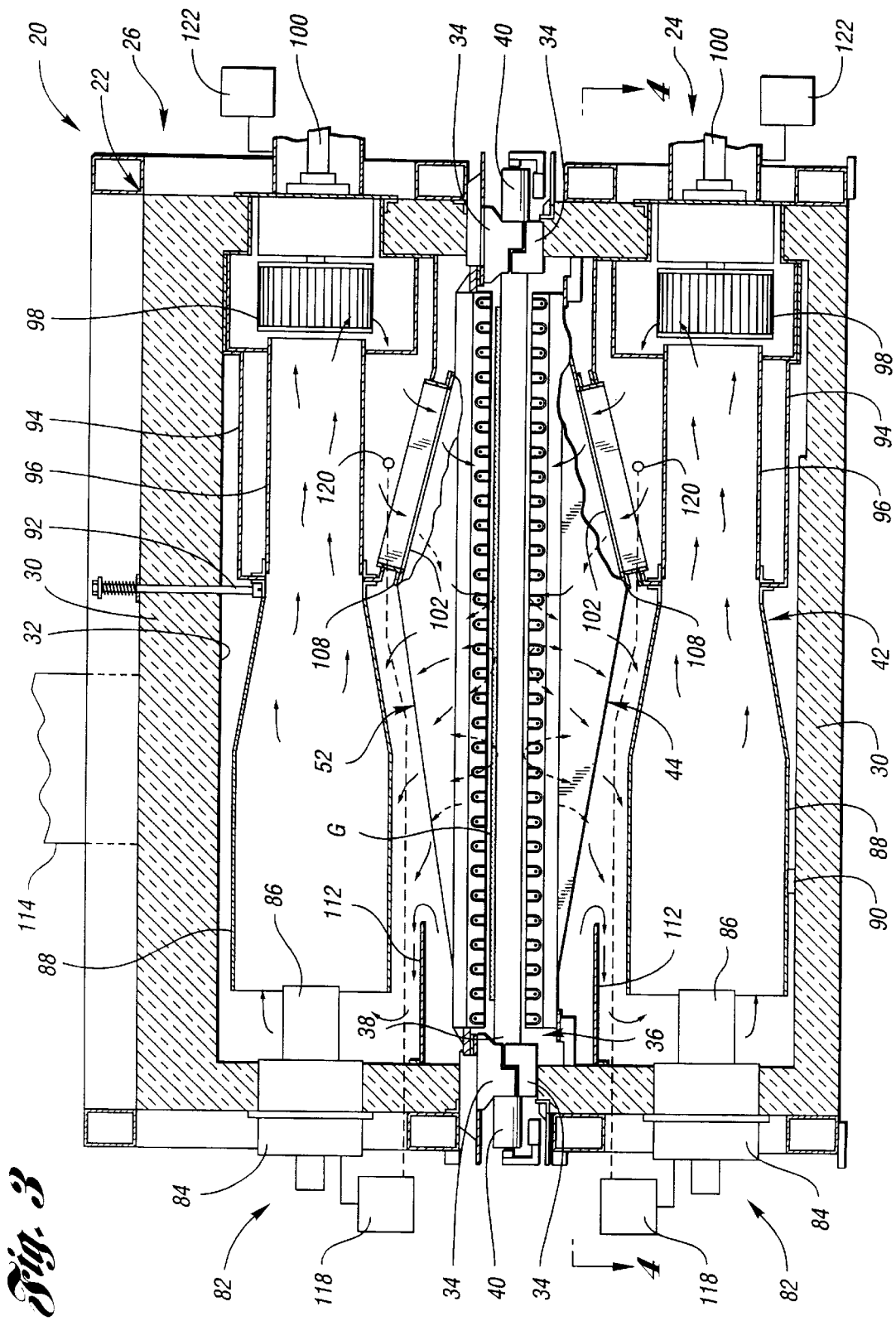
FIG. 3 is a cross sectional view of the furnace taken along line 3—3 in FIG. 2 to further illustrate the construction of the furnace housing, roll conveyor, and forced convection heater.

With continuing reference to FIG. 1, and additional reference to FIGS. 2 and 3, the furnace 20 also includes a roll conveyor 36 located within the heating chamber 32 of the housing 22 and having horizontally extending conveyor rolls 38 for conveying glass sheets G along a direction of conveyance A (FIGS. 1 and 2) within the heating chamber for heating. The conveyor roll 38 as illustrated in both FIGS. 1 and 3 have ends 40 that extend outwardly through the seals 34 at the opposite lateral sides of the furnace so as to be at ambient factory temperature in order to permit rotational driving thereof in any conventional manner without any heat related considerations.

As illustrated in FIGS. 1–3, the furnace 20 includes a forced convection heater 42 including lower hot gas distributors 44 that are located as shown in FIGS. 2 and 5 below alternate conveyor rolls 38. More specifically as illustrated in FIG. 5, each lower hot gas distributor 44 includes a hot gas plenum 46 and a pair of banks of nozzles 48 for supplying hot gas from the plenum thereof for flow upwardly as illustrated by gas jet arrows 50 adjacent the associated conveyor roll 38 both upstream and downstream thereof along the direction of conveyance A to provide heating from below of the glass sheets G being conveyed within the heating chamber. The forced convection heater 42, illustrated collectively in FIG. 3, also as illustrated in FIGS. 2 and 5, includes upper hot gas distributors 52 for providing heating from above of the glass sheets being conveyed within the heating chamber by the roll conveyor.

With the construction of the furnace as described above and specifically the construction of the lower hot gas distributors 44 of the forced convection heater, the hot gas after impinging with the glass sheet can escape downwardly as shown by arrows 54 and there is also room for any broken glass to fall downward without requiring any removal from the conveyor 36.

With continuing reference to FIG. 5, it will be noted that the upper hot gas distributors 52 include nozzles 48 that provide nozzle banks aligned with the nozzle banks of the lower hot gas distributors 44 such that downward gas jet flows as shown by arrows 56 provide aligned lower and upper location of hot gas impingement with the glass sheets G being heated.

With reference to FIGS. 9 and 12, two different embodiments of the hot gas distributors are illustrated and are specifically designed to be constructed as the lower hot gas distributors 44 and in the preferred embodiments can also be utilized as the upper hot gas distributors 52. With each of these embodiments, the nozzles banks include nozzles 48 that are laterally spaced from each other from one bank to the other in an alternating relationship transverse to the direction of conveyance. This construction of the nozzle banks provides uniformity of the heating provided by the hot gas to the glass sheets as they are conveyed for the heating. Also, each embodiment of the hot distributors shown in FIGS. 9 and 12 when used as the lower hot gas distributor has a dimension along the direction of conveyance equal to the diameter of the conveyor rolls 38 and is located directly below the associated conveyor roll so as to have minimal deflection of the upward hot gas flow while still preventing broken glass from falling downwardly onto it.

As illustrated in FIGS. 5 and 9–11, the lower hot gas distributors 44 each include a U-shaped housing 58 that includes a pair of housing members 60 having L shapes with lower flanges 62 that are secured to each other in any suitable manner such as by welding. The U-shaped housing 58 includes a pair of spaced side portions 64 and a connecting portion 66 extending between its side portions. Each lower hot gas distributor 44 also includes an inverted U-shaped cap 68 received within the U-shaped housing 58 thereof and having a pair of spaced side portions 70 and a cap portion 72 extending between its side portions. The spaced side portions 64 of the U-shaped housing 58 and the spaced side portions 70 of the inverted U-shaped cap 68 of each lower hot gas distributor cooperate to define the pair of nozzle banks 48 through which the hot gas jets 50 are delivered for the hot gas flow upwardly to the conveyed glass sheets being heated with this flow as previously mentioned being on opposite sides of the associated conveyor roll 38 both upstream and downstream thereof as illustrated in FIG. 5. Also, the cap portion 72 of the inverted U-shaped cap 68 of each lower hot gas distributor 44 has an inverted V shape so as to facilitate shedding of broken glass that drops downwardly from the roll conveyor.

The construction of the lower hot gas distributors 44 illustrated in FIGS. 5 and 9–11 is made entirely from formed sheet metal. More specifically, the U-shaped housing 58 of each lower hot gas distributor 44 as previously mentioned is provided by the pair of formed sheet metal housing members 60 and the side portions 64 of the housing are formed as best shown in FIGS. 9–11 to define nozzle passages 48' that cooperate with the spaced side portions 70 of the inverted U-shaped cap 68 to define the pair of banks of nozzles 48 of the lower hot gas distributor. This forming of the side portions 64 of the U-shaped housing 58 is provided by inward formations 74 that are vertically elongated and have lower rounded ends 76 as shown in FIG. 10 such that the adjacent formations provide curved converging shapes at the entry end of each nozzle 48. Adjacent their ends 76, the formations 74 have round openings 78 that facilitate securement of the side portions 64 of the U-shaped housing 58 to the side portions 70 of the inverted U-shaped cap 68 such as by welding.

An alternate construction of the lower hot gas distributor is illustrated in FIGS. 12–14 and has a U-shaped housing 58' whose side portions 64' and connecting portion 66' are unitary with each other in the same manner as the side portions 70 and cap portion 72' of the inverted U-shaped cap 68'. However, with this embodiment, nozzle spacers 80 located between the housing and cap side portions 64' and 70' cooperate therewith to define the pair of banks of nozzles 48 of the lower hot gas distributor. These nozzle spacers have semicircular ends 81 that provide curved converging shapes at the entry ends of the nozzles 48.

As illustrated in FIG. 5, the preferred construction of the upper hot gas distributors 52 is the same as the lower hot gas distributors 44 except for being inverted. The hot gas plenum 46 of each upper hot gas distributor 52 is thus defined by an inverted U-shaped housing 58 and a U-shaped cap 66. The spaced side portions 64 of the inverted U-shaped housing 58 of each upper hot gas distributor 52 are connected by its connecting portion 66 and the spaced side portions 70 of the U-shaped cap 68 are connected by its cap portion 72. The spaced side portions of the inverted U-shaped housing 58 and the side portions 70 of the U-shaped cap 68 cooperate to define the pair of banks of nozzles 48 thereof through which the hot gas flows from the hot gas plenum 46 downwardly as shown by arrows 56 to the conveyed glass sheets being heated. As previously mentioned, this downward gas flow as illustrated by arrows 56 is preferably in alignment with the upward gas flow 50 from the lower hot gas distributors 44.

As shown in FIG. 5, each upper hot gas distributor 52 has its inverted U-shaped housing 58 made from sheet metal and has its spaced side portion 64 formed to define nozzle passages that cooperate with the spaced side portions 70 of its U-shaped cap 68 to define the pair of banks of nozzles 48 of the upper hot gas distributor.

The alternate embodiment of the hot gas distributor illustrated in FIGS. 12–14 can also be utilized as the hot gas distributor by inversion from the position shown in FIG. 12 such that its U-shaped housing portion 58' is inverted and its cap 68' has a U-shape that opens upwardly. Thus, with such inversion, the nozzle spacers 80 define nozzles 48 through which the hot gas is directed downwardly toward the conveyed glass sheets being heated.

As illustrated in FIGS. 1 and 3, the forced convection heater 42 includes a plurality of burner assemblies 82 including burners 84 that are mounted by the furnace housing 22 on one lateral side thereof at spaced locations on both the lower and upper housing portions 24 and 26. Nozzle ends 86 of the burners 34 extend into the furnace heating chamber 32 such that the products of combustion thereof flow into the furnace to provide its heating by forced convection. Each burner 84 as shown in FIG. 3 has an associated mixing tube 88 that is open to the burner nozzle end 86 and mounted by the furnace housing 22. More specifically, the lower mixing tubes 88 are mounted by lower mounts 90 and the upper mixing tubes 88 are mounted by upper mounts 92. A plenum housing 94 associated with each burner 84 is mounted within the furnace heating chamber 32 and includes an inlet 96 that extends through the interior thereof from the mixing tube 88 to a blower 98 also located within the plenum housing. Operation of the blowers 98 draws heated products of combustion from the burner 84 and return air from the heating chamber 32 into the plenum housing 94 for flow to the hot gas distributors. Each blower 98 is driven by an unshown motor whose output is connected to an associated driveshaft 100.

As illustrated in FIG. 4, each plenum housing 94 includes an inclined portion 102 including a plurality of elongated rectangular slots 104 within which the associated hot gas distributors are mounted. Both the lower and upper hot gas distributors have a construction as illustrated in FIGS. 6–8 wherein the associated housing 58 includes a rectangular mounting portion 106 having a mounting flange 108 secured thereto in any suitable manner such as by welding. The mounting portion 106 of each hot gas distributor housing 58 is received within the rectangular slot in the incline portion 102 of the associated plenum housing 94 so as to receive hot gas therefrom for flow to the banks of nozzles as previously described. Within the housing 58 of the hot gas distributor, flow deflectors 110 are provided to distribute the flow of hot gas to the entire length of the banks of nozzles between the opposite lateral sides of the furnace housing.

As illustrated in FIG. 3, adjacent the lateral side of the furnace housing 22 on which the burners 84 are mounted, lower and upper baffles 112 are mounted to prevent excessive drawing of cold ambient air into the heating chamber 32 around the roll seals 34. Within the furnace heating chamber, there is a slight pressure above atmosphere that is prevented from being excessive by exhaust ducts 114 shown in FIG. 1 under the control of associated dampers 116.

The burners 84 as shown in FIG. 2 provide a level of heating under the operation of associated controls 118 that include associated thermocouples 120 located within the associated plenum housings 94 to sense the temperature of hot gas being delivered. Also, the blowers 98 are driven by the unshown electric motors whose operation is provided by associated controls 122 that can be coupled with the burner controls 118 to provide any desired operation.

While the best mode for practicing the invention has been defined in detail, those familiar with the art to which this invention relates will recognize various alternative modes for practicing the invention as defined by the following claims.

What is claimed is:

1. A method for heating glass sheets, comprising:

conveying the glass sheets by a roll conveyor on horizontal conveyor rolls spaced along a direction of conveyance within a housing heating chamber;

supplying hot gas flow from below the roll conveyor upwardly adjacent alternate conveyor rolls through a pair of banks of nozzles associated with each alternate conveyor roll for upward flow both upstream and downstream of the associated alternate conveyor roll along the direction of conveyance to provide heating from below of the conveyed glass sheets; and supplying hot gas flow from above the conveyor downwardly to provide heating from above of the conveyed glass sheets.

2. A method for heating glass sheets as in claim 1 wherein the hot gas flows are supplied upwardly and downwardly from aligned nozzles to provide aligned lower and upper locations of hot gas impingement with the glass sheets being heated.

3. A method for heating glass sheets as in claim 2 wherein the upwardly and downwardly supplied hot gas flows are supplied through lower and upper hot gas distributors that have a dimension along the direction of conveyance equal to the diameter of the conveyor rolls.

4. A method for heating glass sheets as in claim 1 wherein the upwardly and downwardly supplied hot gas flows are supplied through lower and upper hot gas distributors that are formed from sheet metal.

5. A method for heating glass sheets, comprising:

conveying the glass sheets by a roll conveyor on horizontal conveyor rolls spaced along a direction of conveyance within a housing heating chamber;

supplying through formed sheet metal lower hot gas distributors hot gas flow from below the roll conveyor upwardly adjacent alternate conveyor rolls through a pair of banks of nozzles associated with each alternate conveyor roll for upward flow both upstream and downstream of the associated alternate conveyor roll along the direction of conveyance to provide heating from below of the conveyed glass sheets;

supplying through formed sheet metal upper hot gas distributors hot gas flow from above the conveyor downwardly through banks of nozzles to provide heating from above of the conveyed glass sheets; and wherein the hot gas flows are supplied upwardly and downwardly through the hot gas distributors with the nozzle banks thereof aligned to provide aligned lower and upper locations of hot gas impingement with the glass sheets being heated.

* * * * *

UNITED STATES PATENT AND TRADEMARK OFFICE
CERTIFICATE OF CORRECTION

PATENT NO. : 6,155,822
DATED : December 5, 2000
INVENTOR(S) : Troy R. Lewandowski It is certified that error appears in the above-identified patent and that said Letters Patent is hereby corrected as shown below:

Please correct the title from "FORCED CONVECTION FURNACE AND METHOD FOR HEATING GLASS SHEETS" to -- METHOD FOR HEATING GLASS SHEETS WITHIN FORCED CONVECTION HEATING APPARATUS --

Signed and Sealed this

Second Day of October, 2001

*Attest:*

*Attesting Officer*

NICHOLAS P. GODICI
*Acting Director of the United States Patent and Trademark Office*